United States Patent [19]
Luetkemeyer

[11] Patent Number: 5,858,041
[45] Date of Patent: Jan. 12, 1999

[54] CLEAN AIR SYSTEM

[75] Inventor: David Luetkemeyer, 833 Windmill Dr., St. Louis, Mo. 63011

[73] Assignees: David Luetkemeyer; C. Patrick Tharp, both of St. Louis, Mo.

[21] Appl. No.: 916,661

[22] Filed: Aug. 22, 1997

[51] Int. Cl.$^6$ ................................................ B01D 50/00
[52] U.S. Cl. ........................ 55/385.2; 55/496; 55/505; 55/506; 55/508; 55/DIG. 18
[58] Field of Search .................. 55/385.2, 496, 55/505, 506, 508, DIG. 18

[56] References Cited

U.S. PATENT DOCUMENTS

| | | | |
|---|---|---|---|
| 3,318,076 | 5/1967 | Baker | 55/385.2 |
| 4,016,809 | 4/1977 | Austin . | |
| 4,178,159 | 12/1979 | Fecteau | 55/502 |
| 4,267,769 | 5/1981 | Davis et al. | 55/385.2 |
| 4,333,745 | 6/1982 | Zeanwick | 55/385.2 |
| 4,693,175 | 9/1987 | Hashimoto . | |
| 4,699,640 | 10/1987 | Suzuki et al. | 55/385.2 |
| 4,927,438 | 5/1990 | Mears et al. | 55/385.2 |
| 5,096,477 | 3/1992 | Shinoda et al. | 55/385.2 |
| 5,279,632 | 1/1994 | Decker et al. | 55/385.2 |
| 5,487,768 | 1/1996 | Zytka et al. | 55/385.2 |
| 5,511,594 | 4/1996 | Brennan et al. . | |
| 5,665,128 | 9/1997 | Peters et al. | 55/385.2 |

FOREIGN PATENT DOCUMENTS

| | | | |
|---|---|---|---|
| 488898 | 6/1954 | Italy | 55/508 |

*Primary Examiner*—Jay H. Woo
*Assistant Examiner*—Minh-Chau T. Pham
*Attorney, Agent, or Firm*—Polster, Lieder, Woodruff, & Lucchesi

[57] ABSTRACT

A clean room includes walls, a floor and a ceiling which define the room. An air delivery system having a HEPA filter, a fan and an air return duct in communication with the filter, is provided to maintain the air in the room clean. A shield of the present invention is mounted in the room over a work surface to form a clean zone over at least a part of the table. The shield is mounted so that at least a part of the filter is within the clean zone so that filtered air will be forced into the clean zone. Accessories, such as an IV bar and a light panel may be provided with the shield to facilitate working in the clean zone. The shield creates a clean zone in the clean room having a higher class rating than the clean room rating without the use of additional HEPA filters and without the use of traditional laminar flow hoods.

24 Claims, 5 Drawing Sheets

CLEAN AIR SYSTEM

BACKGROUND OF THE INVENTION

This invention relates to clean air systems, and in particular, to a system for creating clean air zones in a clean room using the HEPA filters already in position in the clean room.

Laminar flow hoods are typically used to create a clean zone in a work room to contain chemical, biological agents, drugs and other hazardous substances and prevent their release into the atmosphere. A typical laminar flow hood has three sides, a bottom, and a top with a fan-forced source of forced air directed from one of the sides (usually the top or back side) through micro-filters or HEPA (High Efficiency Particle Air) filters. These cabinets are sold on the open market as free-standing units having cabinet walls on three sides with an open-front on one side and a top and a bottom comprised of almost any solid construction material, such as wood, steel, aluminum, hard plastics, or other materials. A HEPA filter is placed behind a porous wall on the top or a side of the cabinet, and an electric fan is positioned behind the HEPA filter to force air through the filter and into the cabinet.

Figure 8:
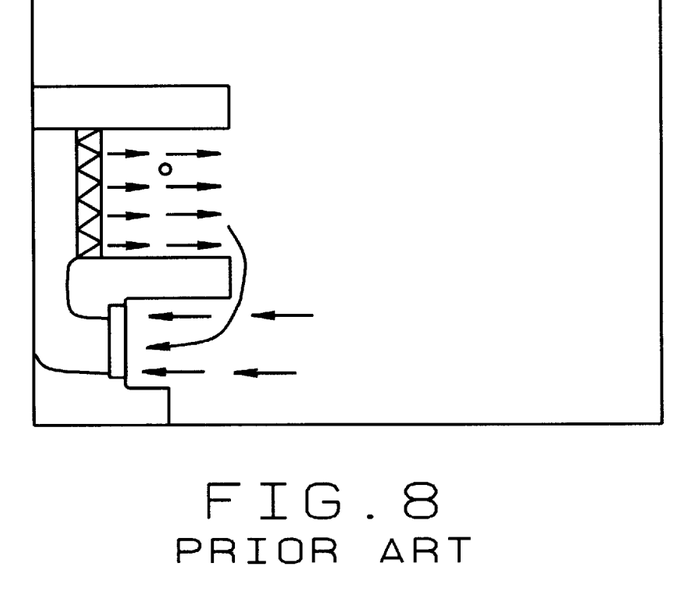
FIGS. 8 and 9 are cross-sectional views of prior art horizontal and vertical laminar flow hoods, respectively.
Figure 9:
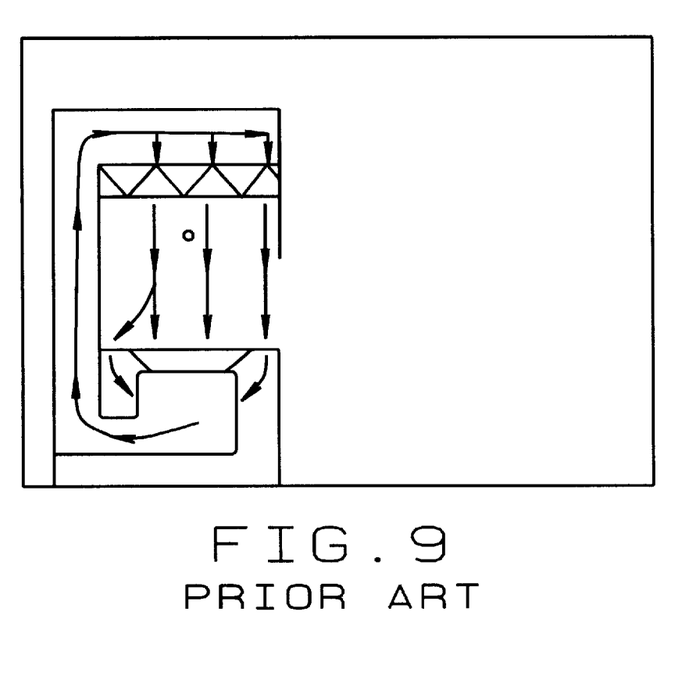

There are generally two types of laminar flow hoods. The first, shown in FIG. 8, is a horizontal laminar flow hood. In a horizontal laminar flow hood, air is usually forced from a side or rear of the cabinet through a porous wall so that the air flows through the filter in a horizontal direction. The filtered air is free of particles over $0.5\mu$. The second type, shown in FIG. 9, is a vertical flow hood. In a vertical flow hood, the air is forced from the top of the cabinet through the HEPA filter, and then exhausted through the front opening of the cabinet to the room in which the cabinet is located. Vertical flow hoods or biological safety cabinets (BSC's) are particularly suited to protect workers or users of the cabinet from substances which may be manipulated inside the cabinet, such as toxic or irritant chemicals, dust, drugs, or biologicals, as well as to protecting the environment. The vertical flow hood in FIG. 9 is a BSC, and as seen, the air flow comes down through the top of the cabinet and passes through the bottom of the cabinet, so that none of the contaminants within the cabinet will escape into the room in which the cabinet is positioned.

In recent years, these cabinets have been used in industry for the clean manufacture of items such as computer chips, parenterally-administered medications, tissue cultures, cell cultures, microbiological testing, chemical mixing and the like. The principal differences in the use of the two types of cabinets or laminar flow hoods is that, although it provides a super-clean air work environment, the horizontal flow hood does not protect the worker from the materials used or manipulated inside the cabinet; but, the vertical flow hood does provide some protection as well as provide a super-clean air work environment.

The most common use of such cabinets has become medical related uses. These hoods are used for mixing medications and fluids for intravenous delivery into the patient for prevention, diagnosis, treatment, mitigation or cure of diseases. These cabinets are widely used, therefore, in hospitals, clinics, pharmacies, home infusion centers, and the like for the purpose of compounding, mixing, labeling or otherwise preparing medications.

Additionally, the vertical flow hoods are typically required to be used in a clean room—a room specially designed to have very low counts of particles in the air. For example, a clean room may have only 10,000 or 1000, or 100 particles per cubic foot of air in the room. Clean rooms are also required by some governmental agencies, such as state boards of pharmacy, or the US. Food and Drug Agency, and by professional standard making organizations, such as the American Society of Health Systems Pharmacists, the ISO 9000 standards for Parentaeral pharmaceutical manufacturing, and so on. In the instance of state boards of pharmacy, there is often a legal regulatory requirement that such environments include a clean room in which the air-born particles over $0.5\mu$ in size number less than 10,000 per cubic foot of air, and that the clean zone (the table-top work area in which the actual mixing, compounding, manipulation, etc.) is performed have less than 100 particles per cubic foot of air. These standards are generally referred to as Class 10,000 or Class 100 work environments, or Class 10,000 or Class 100 laminar flow hoods.

Figure 6:
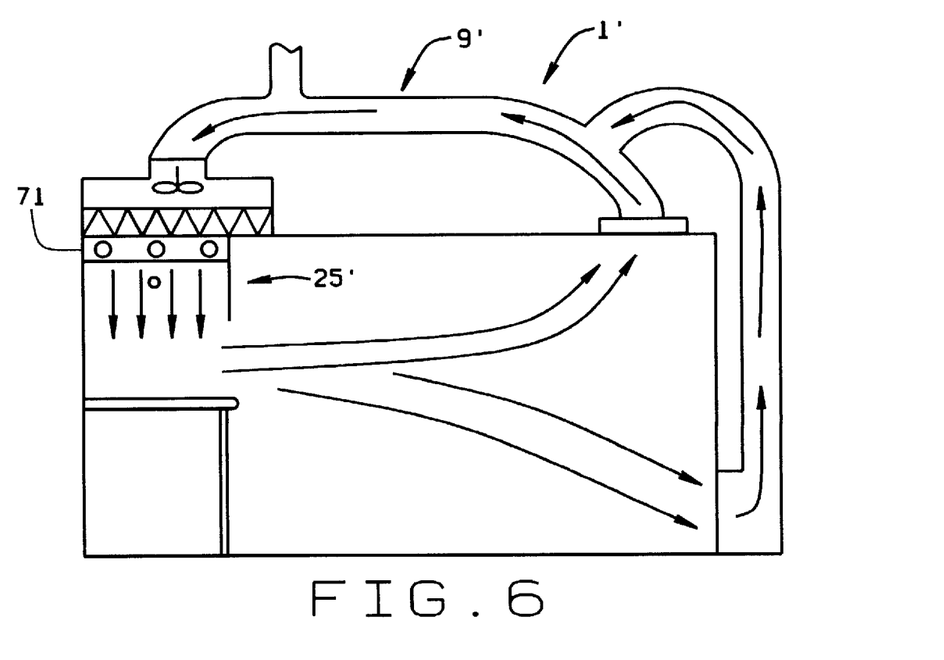
FIG. 6 shows the clean room of FIG. 5, but with a light installed above the table.
Figure 7:
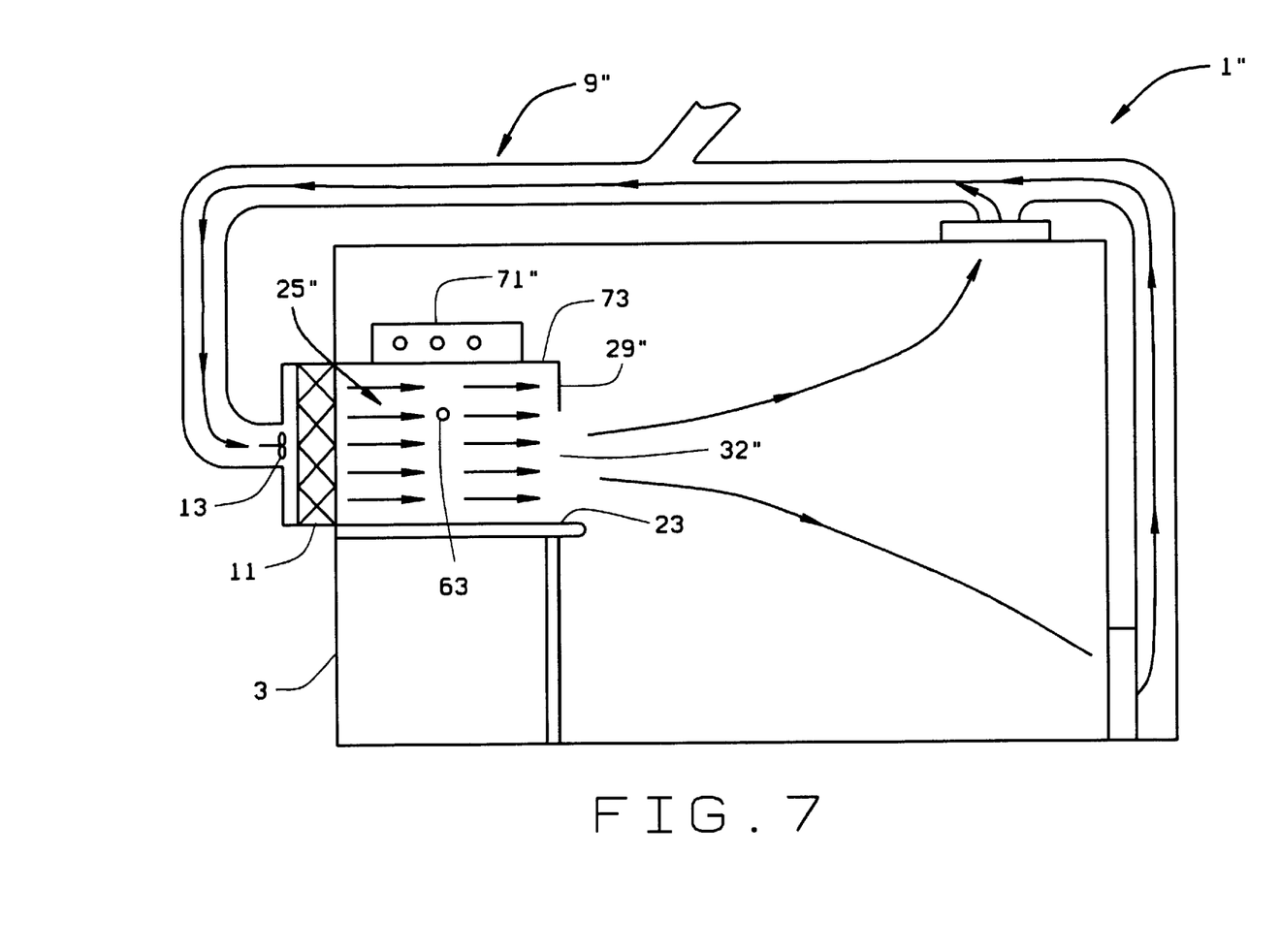
FIG. 7 is a cross-sectional view of a room, similar to FIG. 6, but with a different air flow path.

Heretofore, to provide a Class 100 clean zone in a clean room required the use of a laminar flow hood, such as shown in FIGS. 6 and 7. The laminar flow hoods, whether vertical or horizontal flow hoods, are very expensive to purchase and to set up. Once they are set up in a clean room, the laminar flow hood is essentially fixed in place. The hood cannot easily be moved should the clean room need to be reconfigured or if the hood must be moved to a different room.

BRIEF SUMMARY OF THE INVENTION

A primary object of the invention is to provide a shield which may be easily mounted in a clean room to create a clean zone in the clean room, the clean zone having a higher rating than the clean room.

Another object is to provide such a shield which does not require the use of additional HEPA filters to create the clean zone within the clean room.

Another object is to provide such a shield which can be moved to a different location if it is desired to reconfigure the clean room in which the clean zone is formed, or if a clean zone needs to be created in a different room.

Briefly, a clean room includes walls, a floor and a ceiling which define the room. An air delivery system is provided to maintain the air in the room clean. The air delivery system includes a High Efficiency Particle Air filter or HEPA filter in a wall or ceiling of the room. A fan, in a fan housing forces air through the HEPA filter to filter the air which enters the room. At least one air return duct is provided. Ducting extends between the air return vent and the fan, to recirculate the air in the room through the filter. The air return duct may be placed in the ceiling and/or in the wall of the room. The air delivery system may also be connected to an HVAC system so that the air entering the room can be conditioned. This will help regulate the temperature and humidity of the air in the room.

A shield is provided to define a clean zone in the clean room over the work surface. The shield is mountable in the room so that at least a part of the HEPA filter is within the zone to force filtered air into the zone to create a clean zone in the clean room. In a first embodiment, the filter is mounted in the ceiling and the shield depends from the ceiling. In a room having a dropped ceiling, the filter sits on the T-grids which support the ceiling panels and a bracket is used to suspend the shield from the grid. In a second embodiment, the filter is mounted in the wall and the shield extends from the wall.

In the first embodiment, the shield comprising a front panel depending from the ceiling to a point above the work area. If the clean zone does not extend the full width of the clean room, the shield also includes at least one side panel which extends from the ceiling to the work surface. The side panel is connected to the front panel to form a clean zone of a desired shape. Generally, the side panel will extend perpendicularly from the front panel. The side panel, however, can form an oblique or acute angle with the front shield if desired. The shield can be provided with an IV bar and a light panel to facilitate work in the clean zone. The light panel, in the first embodiment, is mounted to the ceiling beneath the filter and is of the type that will allow the filtered air to pass through it.

In the second embodiment, the shield includes a top panel which extends from the wall of the room in which the HEPA filter is mounted. The light panel, if provided, is mounted in the top panel. The side panels, if used, extend from the wall to the front panel to substantially enclose the clean area.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
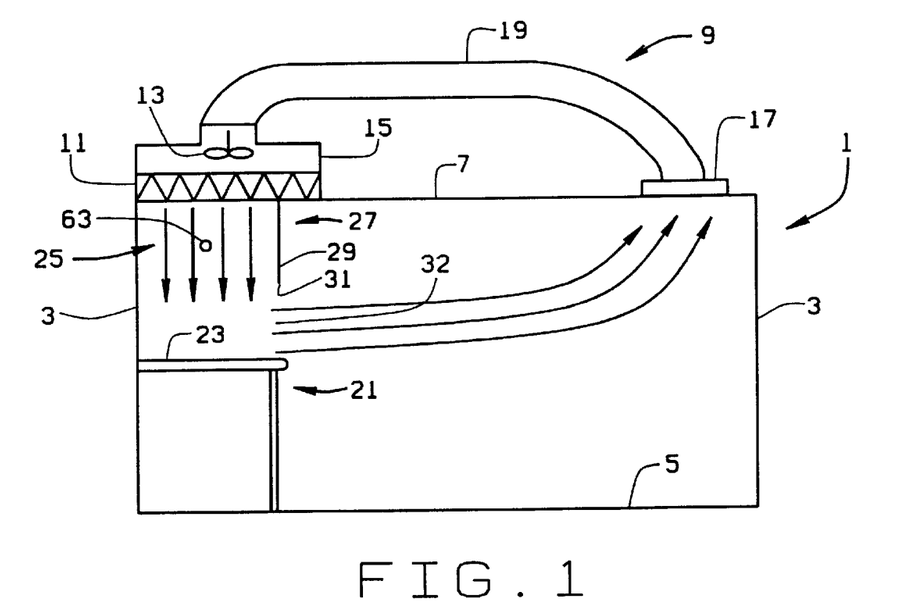
FIG. 1 is cross-section of a clean-room in which a laminar flow shield of the present invention is installed above a work table to create a clean zone within the clean room.

A clean room 1 is shown generally if FIG. 1 to include walls 3, a floor 5, and a ceiling 7. An air delivery system 9 is provided to filter air which enters the room 1 to remove substantially all of the particles in the air so that the room can be denominated as a clean room. The air delivery system 9 includes an HEPA filter 11, a fan 13 inside of a housing 15 and positioned above the filter 11 to force air through the filter 11, a return air vent 17, and duct work 19 which connects the return vent 17 to the fan 13 and filter 11 so that air in the room 1 will be recirculated through the filter 11. A work bench 21 having a work surface 23 is positioned against one of the walls 3 of the room 1.

Figure 5:
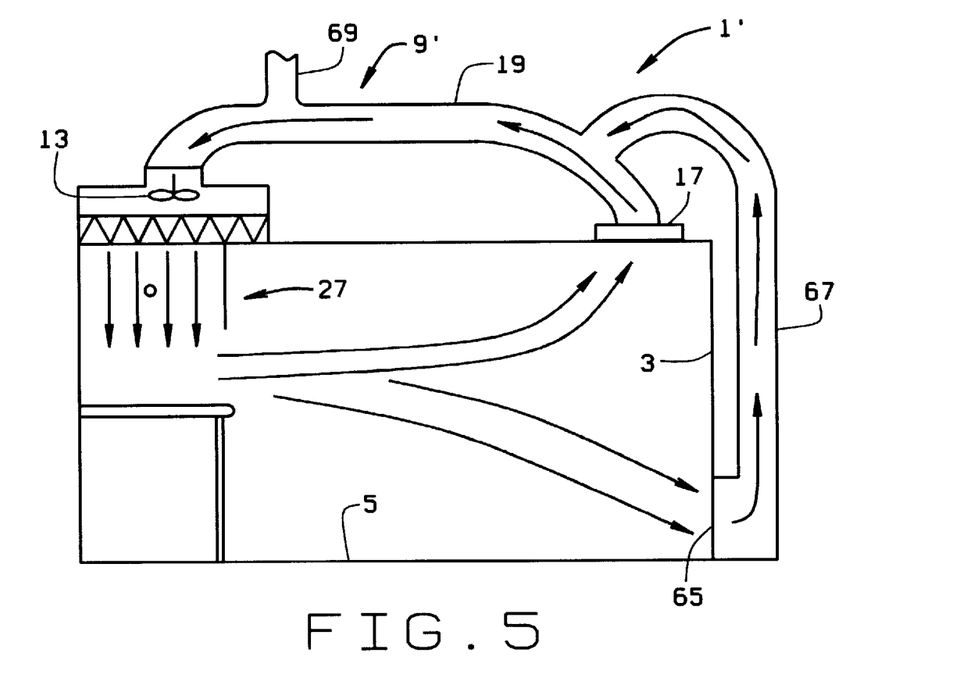
FIG. 5 shows the shield mounted in the clean room, but with the clean room having an alternate flow path of air through the room.

To create a clean zone 25 in the clean room 1, a shield 27 is provided. The shield 27 includes a front panel 29 which is removably attachable to the ceiling 7, which is suspended from the ceiling, and which extends toward the table 21. The shield front panel 29 is suspended from the ceiling 7 above the surface 23 such that a portion of the HEPA filter 11 will be within the clean zone 25 and a portion of the HEPA filter will be outside of the clean zone 25, as best seen in FIGS. 1, 5, and 6. The bottom 31 of the panel 29 is spaced above the surface of the work surface 23 to form an opening 32 which is sufficiently large (preferably about 18") to allow a pharmacist, etc. to use the work surface. If the work surface 23 extends across the room to extend between two opposing side walls 3, then the panel 29 can also extend between the two opposing side walls, such that the clean zone 25 is defined by the front panel 29, the two opposing walls 3, and the ceiling 7.

If the work surface 23 does not extend between two opposing side walls, or it is otherwise not desired to have the clean zone 25 extend fully between the two opposing side walls 3, the shield 27 can also include one or two side panels 33 which extend from the ceiling 7 to the work surface 23. If the work surface is situated in a corner of the room, then only one side panel 27 is needed to create the clean zone 25.

The clean zone relies on positive pressure to maintain the zone as a clean zone. The positive pressure will keep contaminants from entering the clean zone through the opening 32 between the front panel 29 and the table top 23. Thus, there is no need to form an air tight seal between the front panel or the side panels and the ceiling, walls, or table.

As seen in FIG. 1, the filter 11 is in the ceiling 7 above the work surface 23 so that it will blow air vertically through the clean zone 25 and over the work surface 23. The air blown through the clean zone 25 will exit the clean zone through the opening 32 and follow a flow path shown by the arrows which will carry the air to the air return vent 17, which, in FIG. 1, is also shown to be in the ceiling 7. The air will then pass through the duct work 19 to be forced through the filter 11. In this manner, at least some of the air within the room will be recirculated through the filter 11.

As seen, the shield 27 is mounted so that the filter 11 is not completely contained within the clean zone 25. Rather, as noted above, the filter 11 extends beyond the shield 27 so that air which passes through the filter 11 will enter the clean zone 25 and the clean room 1 outside of the clean zone 25. The filter 11, which for example may be a Class 100 HEPA filter, will thus provide filtered and cleaned air directly to both the clean zone 25 and the clean room 1 outside of the clean zone 25. The air flow created by the air blown into the clean room outside of the clean zone will circulate through the room to carry any particles which are brought into the room through the air return vents so that the air will be filtered. Particles, such as dust, etc., can be brought into the clean room 1, simply by people entering the room or by opening packages within the room. By relying on the HEPA filters already in the room, and forcing the air from the HEPA filter into the clean zone, the clean zone will be maintained, for example, as a Class 100 clean zone. Further, the flow of air through the room will remove particles which are introduced into the air within the room (but outside of the clean zone) to maintain the clean room, for example, as a Class 1000 clean room. As can be appreciated, this creates a Class 100 clean zone in a Class 1000 clean room without the use of additional HEPA filters.

Figure 3:
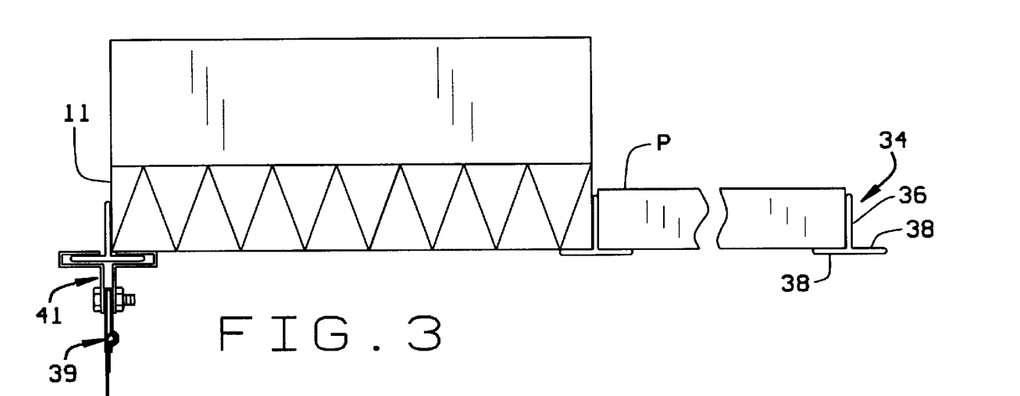
FIG. 3 is an enlarged cross-sectional view of the ceiling of the room, showing the manner in which the filter and the shield are supported.
Figure 4:
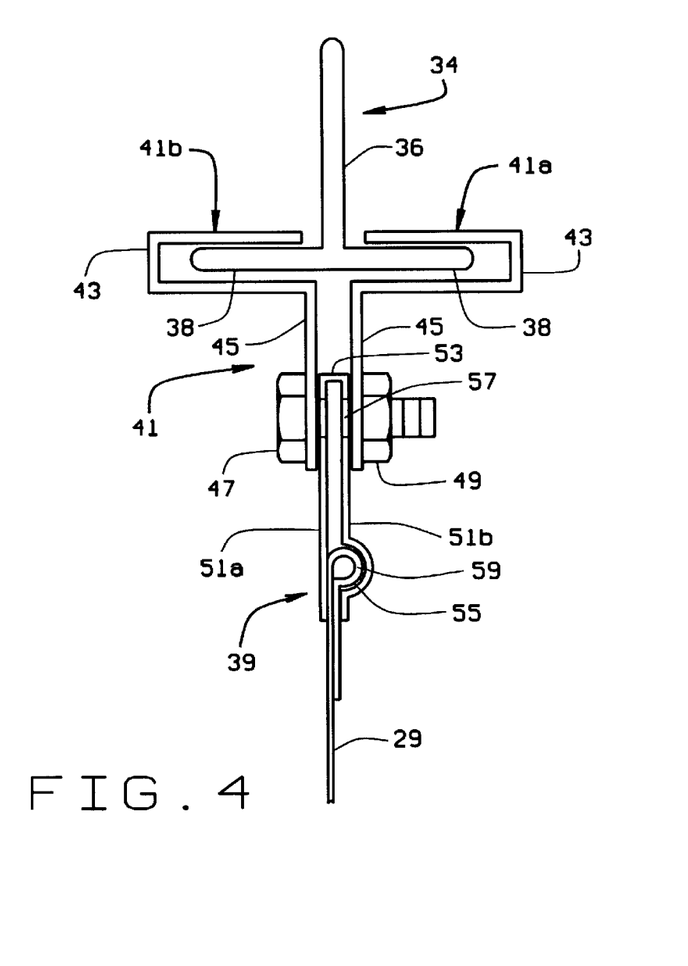
FIG. 4 is an enlarged side elevational view showing the bracket used to suspend the shield from a T-grid of a dropped ceiling.

Typically, the ceilings 7 of clean rooms, such as clean room 1, are drop ceilings which include a plurality of panels P which are supported in the ceiling 7 by inverted T-members 34 which define a grid in the ceiling 7, as is known. The T-members include a stem 36 and oppositely extending flanges 38. The front panel 29 of the shield 27 is suspended from the T-members 34 by clips 39 and brackets 41. The brackets 41 are two piece brackets which include identical right and left halves 41a,b. Each bracket half includes an upper U-shaped section 43 which extends horizontally and is sized to accept a flange 38 of the T-member 34. A leg 45 depends from a bottom of the U-shaped section 43. The two halves 41a,b are then held together by a bolt 47 and nut 49 which passes through the legs 45 of the two halves.

The spring clip 39 is generally shaped as in inverted U, and includes first and second legs 51a,b and a web 53 which extends between the legs 51a,b at the tops thereof. The leg 51b has channel 55 which extends generally parallel to the T-member 34. The channel 55 is formed near the bottom of the clip 39. The clip 39 includes a bolt hole 57 in the legs 51a,b near the tops thereof. The bolt 47 passes through the bolt holes 57 to secure the clip 39 between the legs 45 of the bracket 41. The clip 39 is thus sandwiched between the bracket legs 45. To suspend the panel 29 from the ceiling 7, the bracket halves 41a,b are placed over the flanges 38 of the T-member 39. The top of the panel 29 is rolled, as at 59. The legs 51a,b of the spring clip 39 are separated and the roll 59 is positioned in the channel 55. The clip is allowed to spring back, and the panel 29 is held in place in the clip by the spring force of the clip. The width or diameter of the roll 59 is greater than the distance between the legs 51a,b beneath the channel 55, so the panel 29 will be retained in the clip 39. The clip 39 is then inserted between the legs 45 of the bracket and the bolt is passed through the bolt holes of the bracket halves and the clip to secure the clip to the bracket and to suspend the panel 29 from the ceiling. The clip 39 and bracket 41 can be cut to a desired length, such that the panel 29 is fully supported along its top edge. Alternatively, the clip 39 and bracket 41 can be substantially shorted than the length of the panel 29. In this instance, a plurality of clips and brackets would be used to support the panel 29.

If the ceiling 7 is a hard ceiling (i.e. a sheet-rock or wall board ceiling), the HEPA filter is placed in the ceiling by cutting a proper opening in the ceiling. A sheet-rock/dry wall adapter is then used to suspend the HEPA filter from the ceiling. In this instance, the bracket 41 is adapted to be secured to the ceiling. The top of the bracket is fixed to the ceiling, with screws, for example which pass through screw holes formed in the U-shaped section 43 of the bracket halves. The clip 39 can then be used, as described above, to suspend the shield panels from the hard ceiling.

Figure 2:
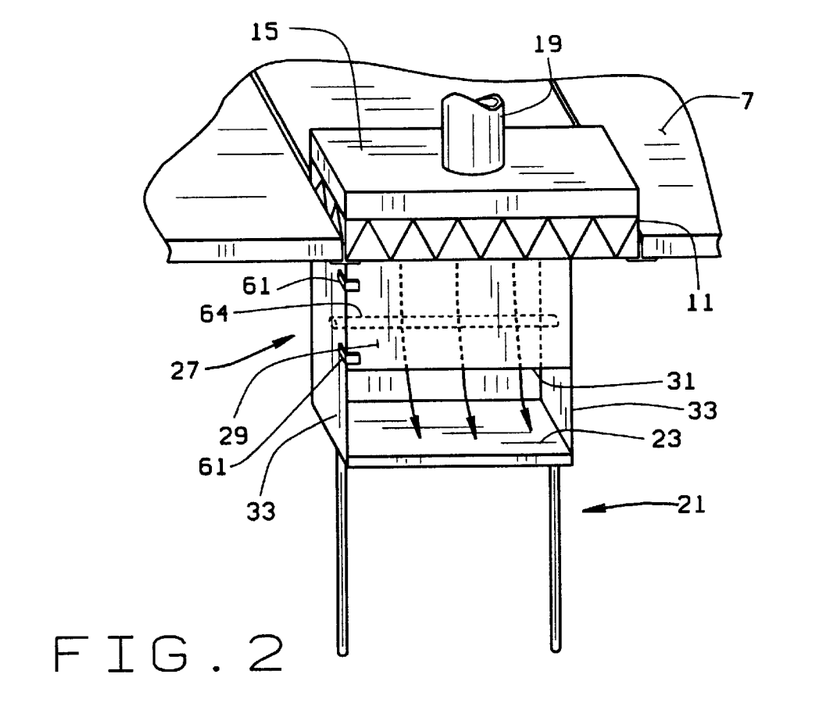
FIG. 2 is a perspective view of the flow shield.

If side panels 33 are used, the panels 33 are suspended from the ceiling 7 in the same manner as the front panel 29. Further, the side panels 33 are connected to the front panel 29 by the use of clips 61 (FIG. 2). Because positive pressure is relied upon, the clips 61 used to connect the front and side panels 29 and 33 can be spaced apart. As noted above, an air tight seal between the front and side panels is not necessary. In FIG. 2, only two clips 61 are shown; one near the top of the panels and one near the bottom of the side panel 33.

The shield 27 can be provided with accessories to facilitate the use of the work surface 23 within the clean zone 25. In FIGS. 1 and 2, an IV bar 63 is provided and extends between the two sides of the clean zone 25. As shown in FIG. 2, the IV bar 63 extends between the two side panels 33 of the shield 27.

Turning to FIG. 5, the clean room 1' is shown with a second air return vent 65 in one of the walls 3 of the room 1'. The vent 65 is shown positioned near the floor 5 of the room 1' and is connected to the duct work 19 by way of further duct work 67. The ducting system of the room 1' also includes a shunt 69 connected to the duct 19 which will allow air to be directed to the room 1' from an HVAC (heating, ventilation, and air conditioning) system (not shown). This will allow for control of the temperature and humidity of the air which enters the room 1'. The shunt 69 is positioned such that the air from the HVAC system which enters the air delivery system 9' of room 1' is directed to the HEPA filter 11. Thus, the air from the HVAC system cannot enter the room 1' through either of the return vents 17 or 65.

FIG. 6 shows the room 1' with air delivery system 9' and with a first variation of the shield. The shield 25' is substantially similar to the shield 25 of FIGS. 1 and 2. However, the shield 25' is provided with a light panel 71 which is positioned beneath the HEPA filter 11. The light panel is part of a lighting kit which is commercially available and can be installed in series with the HEPA filet. The kit is placed and secured by clips and mounting hardware (which are provided with the kit) to the drop-ceiling T-members 34 or to the sheet-rock adapter used to suspend the HEPA filter and air system in the ceiling.

FIG. 7 shows a clean room 1" with an air delivery system 9". The air delivery system 9" is substantially similar to the air delivery system 9' of FIG. 4, however, instead of having the fan 13 and filter 11 mounted in the ceiling as in FIG. 4, the fan 13 and filter 11 are mounted in one of the walls 3. The air delivery system 9" will therefore blow the air horizontally across the work surface 23. The shield 27" which forms the clean zone 25" above the work surface 23 includes the front panel 29", side panels (not shown) if necessary, and a top panel 73. The top panel 73 extends from the wall 3" over the surface 23, and the front panel 29" extends downwardly from the panel 73 towards the table. As in the shield 27 of FIG. 1, the front panel does not extend all the way to the work surface 23 to provide an opening 32" to the clean zone 25". A light panel 71" is placed on the top panel 73 to provide lighting in the clean zone 25". If desired, an IV bar 63 can extend across the clean zone 25" above the work surface 23.

The shield of the invention allows for the designer of the clean room to create a clean zone of having less than 100 particles greater than $0.5\mu$ in size per cubic foot (i.e., better than a Class 100 clean zone). In addition, the shield of the invention permits the design of a clean room in which the clean room has, for example, a Class 10,000 rating, but which has a clean zone with a rating of better than Class 100, for example. Thus, the device and proper design and positioning of the shield and return grills and ducts simultaneously provides for a Class 10,000 clean room having a Class 100 clean zone for manipulating sterile products or high technology devices in a super-clean environment. As can be appreciated, this is accomplished without the use of laminar flow cabinets and without the use of HEPA filters which are dedicated to the clean zone. Depending on the size of the room, more than one set of HEPA filters, forced air sources, and shields may be necessary to achieve the Class 10,000 clean room and the Class 100 clean zone simultaneously.

The shield may be made of any desired material, including metal, clear or translucent glass or plastic, wood, Formica, or any other non-shedding material. The front panel of the shield may even be made of solid sheets of material or semi-soft plastic curtains or strips of contiguous or overlapping materials arranged to provide an air flow barrier. The front panel of the shield, however, is preferably made of a transparent high-density plastic, polyethylene, or glass, which provides the user with a clear view of the clean zone in which the manipulations of substances are being carried out. The front panel can be 0.05" to 1" in thickness. It can be from 1–7 feet tall and from 1–8 feet wide. The preferred dimensions regarding the width and height of the front panel may depend on the size and number of HEPA filters available in the room, the ceiling height, the height of the work surface, and economic factors.

The shield of the present invention has many advantages over the cabinets which are commonly used to create clean zones. First, the shield of the present invention is significantly less expensive than are laminar flow cabinets. The shield has no moving parts, and is thus easy to maintain. It is also portable. The shield can be easily taken down and set up again to allow for the space in the clean room to be redesigned as necessary, or even movement of the shield to another room to create a clean zone in that other room. To move the shield, all that need be done is remove the brackets 41 from the ceiling 7. If necessary, the clips 39 can be removed from the brackets 41. However, the panels do not need to be removed from the clip 39.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, a clean zone could also be created in the middle of a room (i.e., not against one of the wall of the room) by providing a back panel which extends from the ceiling to the work surface 23. The shield 27 can be connected directly to the bracket 41 to suspend the shield from the ceiling. This would eliminate the need for the clip 39. In this instance, the shield panels would be placed between the bracket legs 45, and a pin, bolt, or the like, would extend through the bracket legs and the shield to mount the shield in the bracket. This example is merely illustrative.

I claim:

1. In combination, a preexisting clean room and a kit installable in the clean room to provide a clean zone at a selected area in the clean room; the clean room having walls, a drop ceiling, a plurality of T-shaped members defining a grid which supports said drop ceiling, a floor, and an air delivery system which filters particles from the air; the air deliver system including a filter supported by said members of said grid, a fan which forces air through the filter, an air return, and duct work connecting the air return to the fan, so that at least some air from the room is recirculated through the filter; and a work surface positioned in the room so that the air delivery system forces air over the work surface; the kit including a shield suspended from the ceiling above the work surface to extend toward the work surface, the shield defining the clean zone over at least a part of the work surface; the shield being mountable to the ceiling so that at least a part of the filter is within the clean zone to force filtered air into the zone to create a clean zone in the clean room; and a bracket which is mounted to the ceiling to suspend the shield from the ceiling, the bracket including a right half and a left half, each said half including a head portion which fits over the grid members, a leg portion which depends from the head portion, and a fastener which holds the bracket halves together; the shield being operatively connected to the bracket leg portion.

2. The combination of claim 1 wherein the shield is positioned such that a portion of the filter is outside of the clean zone.

3. The combination of claim 1 including a clip, the clip having an open bottom sized to receive the shield, the clip being secured between the legs of said bracket halves.

4. The combination of claim 3 wherein the clip has two spaced apart downwardly extending legs, the shield being positioned between the clip legs.

5. The combination of claim 4 wherein the clip is a spring clip.

6. The combination of claim 4 wherein the shield includes a roll at a top edge thereof; one of the clip legs defining a channel which extends generally parallel to the ceiling, the channel being sized to accept the roll, the roll being larger in diameter than a distance between the two clip legs.

7. The combination of claim 1 wherein the work area is positioned against at least one of the walls of the clean room, the shield comprising a front panel depending from the ceiling to a point above the work area.

8. The combination of claim 7 wherein the shield includes at least one side panel which extends from the ceiling to the work surface, the at least one side panel being connected to the front panel by at least one clip; said front and side panels being independent of each other and being suspended from the ceiling, the front panel having side edges and a bottom edge extending between said side edges; said front panel bottom edge being spaced above the work surface; said at least one side panel having a front edge and a back edge, said side panel front edge being adjacent one of said front panel side edges; said at least one clip connecting said side panel front edge to said front panel side edge; said at least one clip being substantially shorter than the edges of said panels; the shield defining a zone over at least a part of the table, the shield being mountable to the ceiling so that at least a portion of the filter directs filtered air into the zone such that the zone will be a clean zone.

9. The combination of claim 8 wherein said shield includes two opposing side panels which extend from the ceiling to the work surface.

10. The combination of claim 1 wherein the shield includes an IV bar extending between sides of said work area.

11. The combination of claim 1 wherein the filter is mounted in the ceiling and the shield includes a light panel beneath the filter.

12. The combination of claim 1 wherein the filter is in the wall, the clean zone having horizontal air flow.

13. A clean zone kit for forming a clean zone within a clean room; the clean room including walls, a ceiling, a floor, an air delivery system which filters particles from the air, and a work surface in the room; the air delivery system including a filter, a fan which forces air through the filter, an air return, and duct work connecting the air return to the fan, so that at least some air from the room is recirculated through the filter; the work surface being positioned in the room so that the air delivery system forces air over the work surface; the clean zone kit including a shield mountable to the ceiling; the shield having a front panel, at least one side panel, and at least one clip to hold said front and side panels together; said front and side panels being independent of other and being suspended from the ceiling, the front panel having side edges and a bottom edge extending between said side edges; said front panel being sized such that its bottom edge is spaced above the work surface when said shield is installed in said clean room; said at least one side panel having a front edge and a back edge, said side panel front edge being adjacent one of said front panel side edges; said at least one clip connecting said side panel front edge to said front panel side edge; said clip being substantially shorter than the edges of said panels; the shield defining a zone over at least a part of the work surface, the shield being mountable to the ceiling so that at least a portion of the filter directs filtered air into the zone such that the zone will be a clean zone.

14. The clean zone kit of claim 13 including an IV bar which extends between opposing side walls of the clean zone.

15. The clean zone kit of claim 13 including a light panel which illuminates the clean zone.

16. The clean zone kit of claim 15 wherein the light panel is mounted beneath the filter, the light panel being shaped and configured to allow filtered air to pass therethrough.

17. A clean zone kit for forming a clean zone above a work surface within a preexisting clean room;

the clean room including walls, a ceiling, a floor, an air delivery system which filters particles from the air, and a work surface in the room; the air delivery system including an air filter mounted in a wall of the room, a fan which forces air through the filter, an air return, and duct work connecting the air return to the fan, so that at least some air from the room is recirculated through the filter; the work surface being positioned in the room against the wall in which the filter is mounted so that the air delivery system forces air over the work surface; the clean zone kit including a shield mountable above the work surface to create said clean zone at said work surface;

the shield including a top panel mounted to the wall in which the filter is located such that at least a portion of the filter is below the top panel and a front panel which depends from the top panel, the front panel having a bottom edge spaced above the work surface; the shield in combination with said wall defining a zone over at least a part of the work surface, the shield being mountable to the wall so that at least a portion of the filter directs filtered air into the zone.

18. The clean zone kit of claim 17 wherein the shield includes at least one side panel, the clean zone being defined by at least one wall of the room, the at least one side panel, the front panel, and the ceiling.

19. A clean zone kit for forming a clean zone above a work surface within a clean room, the clean room having a drop ceiling formed from a ceiling grid and a plurality of ceiling panels supported by said grid; the kit including at least a front panel and a bracket assembly to suspend the panel from the ceiling in the clean room; the bracket assembly including:

a bracket having a left half and a right half, each bracket half including an upper U-shaped section sized to accept a portion of the ceiling grid; and a leg depending from a bottom of the U-shaped section; and a clip which is held between the legs of said left and right halves of said bracket, said clip including a first clip leg and a second clip leg; and a channel formed in one of said clip legs; said channel extending generally perpendicularly to an axis of said clip;

said kit panel including an enlarged top edge, said enlarged top edge being sized to be received in said clip channel.

20. The clean zone kit of claim 19 wherein the clip is a spring clip.

21. The clean zone kit of claim 19 wherein said bracket legs have aligned holes therethrough and said clip legs include aligned holes therethrough; said bracket assembly including a fastener which extends through said clip legs and said bracket legs; said fastener holding said clip between said bracket halves and holding said bracket halves together.

22. The clean zone kit of claim 21 wherein said bracket leg holes are near bottoms of said bracket legs.

23. The clean zone kit of claim 19 wherein said channel in said clip leg is positioned near a bottom of said clip leg.

24. The clean zone kit of claim 13 wherein the shield is removably mountable to the ceiling of the clean room.

* * * * *